Oct. 7, 1969     R. P. BAUMLER     3,471,153
SIMULATED ACTION TARGET APPARATUS
Filed Sept. 15, 1967     2 Sheets-Sheet 1
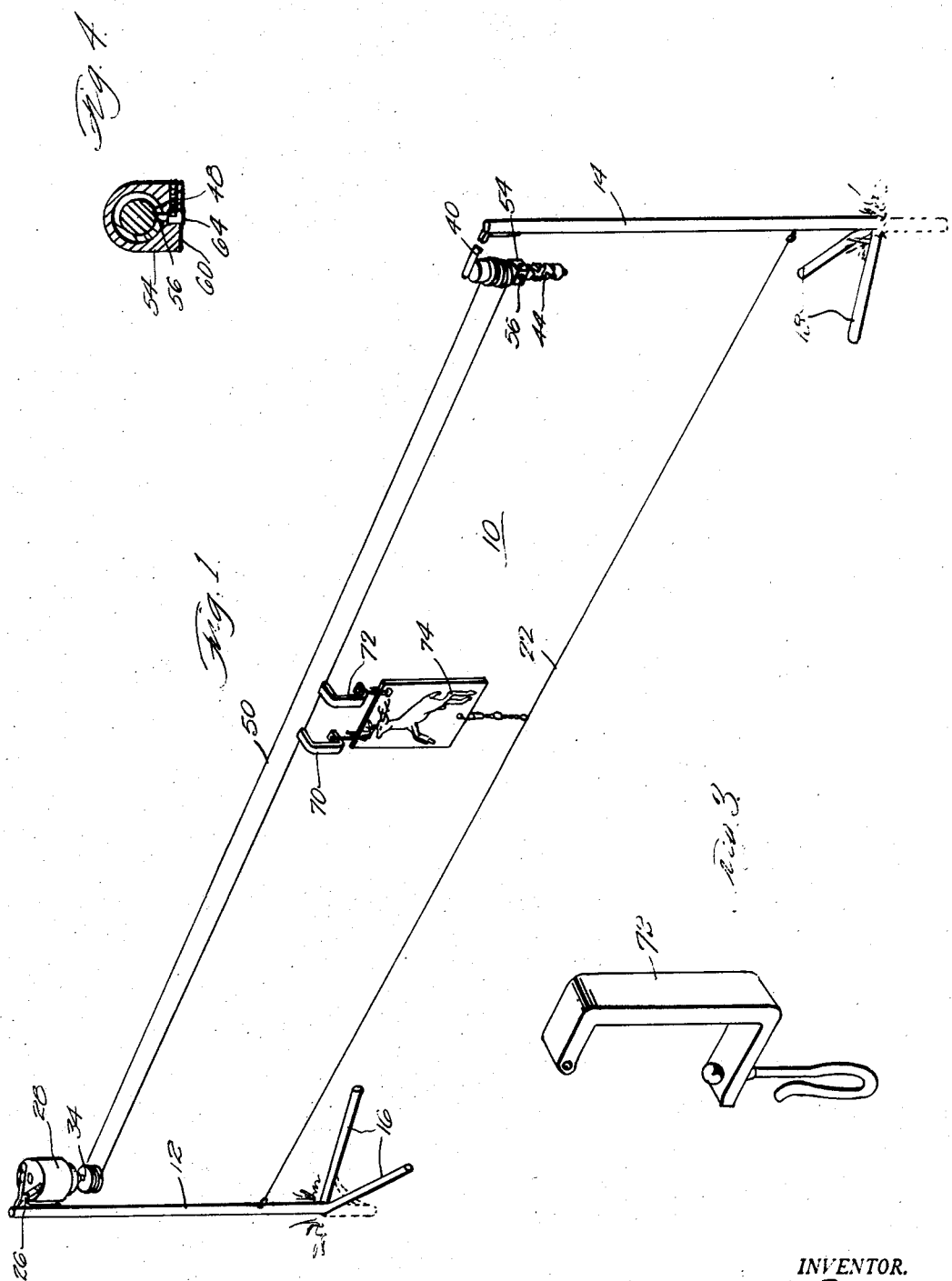
INVENTOR.
RAYMOND P. BAUMLER
BY
*Victor J. Evans & Co.*
ATTORNEYS

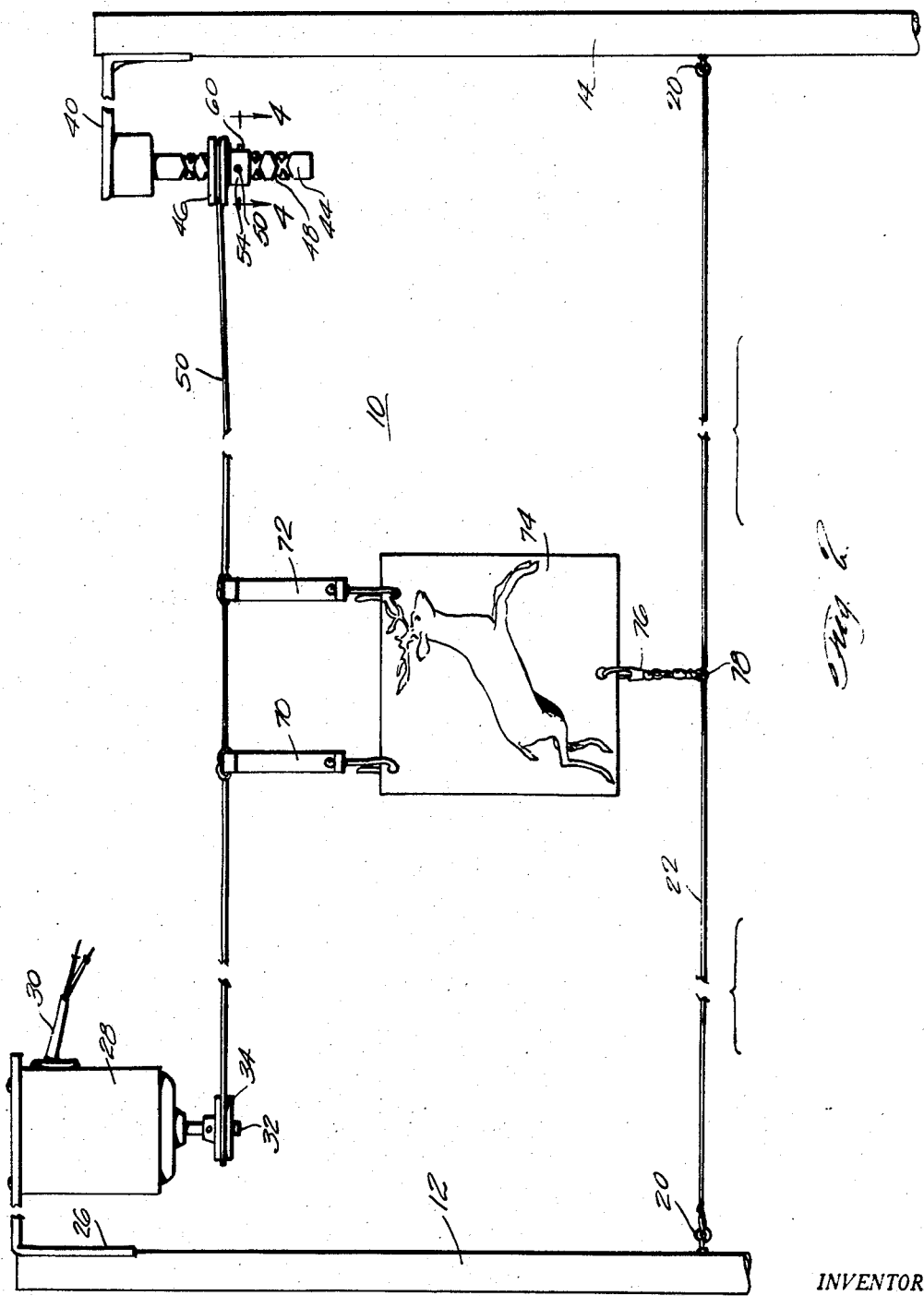

United States Patent Office 3,471,153
Patented Oct. 7, 1969

3,471,153
SIMULATED ACTION TARGET APPARATUS
Raymond P. Baumler, Wheatland, N. Dak. 58079
Filed Sept. 15, 1967, Ser. No. 668,101
Int. Cl. A63b 63/04
U.S. Cl. 273—105.2                     4 Claims

ABSTRACT OF THE DISCLOSURE

A simulated action target apparatus that provides a target area disposed to traverse the distance between two upstanding poles and which is caused to simulate the bounding effect of an animal running, an animal such as a deer or the like by means of a motor driven pulley, an endless tensioned line, and a follower pulley keyed to traverse a spiralled grooved shaft on the other pulley, to effectuate the bouncing or bounding effect of an animal running along the terrain intermediate said spaced pair of poles.

---

The present invention relates to a simulated action target apparatus, and more particularly, the invention relates to simulated action target apparatus for providing a bounding effect of the target as it traverses the terrain intermediate two upstanding spaced apart poles, or the like.

An object of the invention is to provide simulated action target apparatus that provides a leaping effect or bounding effect to the target as it is driven by a motor on a tensioned line between two poles, so that the spiralled grooved shaft on which is mounted a keyed pulley causes the target means to undulate in an effective sinusoidal motion resembling the bounding effect of a deer or other animal as it would run the distance between the two poles.

A further object of the present invention is to improve the interest in target shooting by simulating the action of wild animals on the run.

The above and other objects and advantages of the invention will become apparent upon full consideration of the following detailed description and accompanying drawings in which:

FIGURE 1 is a righthanded perspective view of the simulated action target apparatus of the present invention;

FIGURE 2 is a front elevation view thereof according to the preferred embodiment of the present invention;

FIGURE 3 is an enlarged detailed view of one of the support means for attaching the target apparatus to the endless tensioned line shown in FIGURES 1 and 2; and FIGURE 4 shows a cross-sectional view taken along lines 4—4 of FIGURE 2.

Referring now to the drawings, there is shown a simulated action target apparatus 10 including a pair of two upstanding poles 12, 14 mounted on the ground and having upright supports 16, 18 respectively. At a lower intermediate portion of each of the poles 12, 14 there is mounted a hook 20, between which is a tensioned line 22 disposed therebetween. At the upper end of pole 12, there is a bracket 26 from which is mounted a motor 28 energized by electrical wires 30, and said motor 28 having a motor shaft 32 to which is fixedly attached a pulley 34 driven by said motor 28.

On the upper end of the other pole 14, there is mounted a bracket member 40 and from the end of which is fixedly attached a spiralled cross-grooved shaft 44. On the spiralled grooved shaft 44, there is moutned for rotation thereon a keyed pulley 46 which follows the spiralled grooves 48 of the shaft 44, resulting in an oscillating motion of the pulley 46 along the shaft 44 as the pulley 46 is turned or rotated by an endless tensioned line 50, driven by the pulley 34.

The pulley 46 is seen to have a hub 54 shown more particularly in FIGURE 4 of the drawings, and in which the pulley is seen to have a key 56 that follows along the spiralled groove 48.

A mounting plate 60 provides retention of the key 56 in place, and the mounting plate 60 is retained in place by a threadedly engaging screw 64 mounted in the hub 54.

To the line 50, there is securely mounted target supporting hooks 70, 72 for supporting in vertical arrangement a target board 74 and from the lower portion thereof, of which is disposed a slottedly engaged chain means 78 having the lower link or loop 78 receiving the tensioned line 22. Thus, as the target 74 traverses the distance between pole 12 to pole 14 by means of the motor 28 driving the pulley 34, the loop 78 passes along line 22 between the hooks 20, 20 on poles 12, 14.

Additional embodiments of the invention in this specification will occur to others and therefore it is intended that the scope of the invention be limited only by the applicant's appended claims and not by the embodiment described hereinabove. Accordingly, reference should be made to the following claims in determining the full scope of the invention.

What is claimed is:
1. A simulated action target comprising:
a first support, a first pulley, means rotatably mounting the pulley on the support,
a second support spatially disposed apart from the first support,
a second pulley, means rotatably and slideably mounting the second support,
the last recited means including means cooperating with the second pulley for causing the second pulley to make alternate upward and downward traversals of the mounting means when the pulley is rotated,
an endless tensioned line disposed about both pulleys, means for driving the line about the pulleys,
a target means,
means fixedly mounting the target means to the endless line.
2. The target of claim 1 wherein the driving means is a motor mounted on the first support in driving engagement with the first pulley.
3. The target of claim 1 wherein the means rotatably mounting the second pulley includes a cross-grooved shaft and wherein the second pulley includes a key disposed in the groove of the shaft.
4. The target of claim 1 wherein there is included a second tensioned line disposed between the supports and beneath the endless line, and means mounted on the target means slideably engaging the second line.

References Cited

UNITED STATES PATENTS

| | | | |
|---|---|---|---|
| 650,008 | 5/1900 | Hamel | 273—105.2 |
| 668,219 | 2/1901 | Rock | 273—105.2 |
| 1,639,596 | 8/1927 | Dritz | 273—105.2 X |
| 3,297,326 | 1/1967 | Corwin et al. | 273—105.2 |
| 3,363,900 | 1/1968 | Cadle | 273—105.2 |

FOREIGN PATENTS 241,694  12/1911  Germany.
223,979   1/1943  Switzerland.

ANTON D. OECHSLE, Primary Examiner
MAX R. PAGE, Assistant Examiner